US006287676B1

(12) United States Patent
Ruppel et al.

(10) Patent No.: US 6,287,676 B1
(45) **Date of Patent: *Sep. 11, 2001**

(54) COMPOUND SHEETS MADE OF ABSORBENT PAPER

(75) Inventors: Remy Ruppel, Durrenentzen; Pierre Laurent, Colmar; Joel Hungler, Urschenheim, all of (FR)

(73) Assignee: Georgia-Pacific France, Kunheim (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/098,325

(22) PCT Filed: Feb. 10, 1993

(86) PCT No.: PCT/FR92/01156

§ 371 Date: Oct. 5, 1993

§ 102(e) Date: Oct. 5, 1993

(87) PCT Pub. No.: WO93/12293

PCT Pub. Date: Jun. 24, 1993

(30) Foreign Application Priority Data

Dec. 9, 1991 (FR) .................................................. 91 15209
Dec. 7, 1992 (FR) .................................................. 92 01156

(51) Int. Cl.[7] ........................................................ B32B 7/02

(52) U.S. Cl. .......................... 428/219; 428/218; 428/220; 428/191; 428/193; 428/212

(58) Field of Search .................................... 425/363, 403, 425/364, 336, 296; 428/154, 218, 166, 178, 183, 184, 191, 219, 212, 156, 193, 172, 332, 220; 156/209, 210, 219, 220, 290, 291, 292, 469, 555; 162/113, 117, 205; 118/44, 221, 225

(56) References Cited

U.S. PATENT DOCUMENTS

| | | | | |
|---|---|---|---|---|
| 2,043,351 | * | 6/1936 | Fourners et al. | 154/33 |
| 2,854,336 | * | 9/1958 | Gutkwecht | 96/36 |
| 3,142,599 | * | 7/1964 | Chavannes | 156/210 |
| 3,399,101 | * | 8/1968 | Magid | 161/5 |
| 3,414,459 | * | 12/1968 | Wells | 161/131 |
| 3,466,212 | * | 9/1969 | Clayton | 156/199 |
| 3,547,723 | * | 12/1970 | Gresham | 156/209 |
| 3,708,366 | * | 1/1973 | Donnelly | 156/209 |
| 3,867,225 | * | 2/1975 | Nystrand | 156/209 |
| 3,868,205 | * | 2/1975 | Thomas | 425/363 |
| 4,320,162 | * | 3/1982 | Schulz | 428/154 |

* cited by examiner

*Primary Examiner*—Merrick Dixon
(74) *Attorney, Agent, or Firm*—Breiner & Breiner, L.L.C.

(57) ABSTRACT

The compound sheet made of absorbent paper consists of at least two crepe paper sheets with a specific weight between 12 and 30 g/m$^2$. At least one sheet includes a first embossing pattern with bosses pointing inward the compound sheet and having a height of between 0.5 and 2.5 mm, a density of between 3 and 20 bosses per cm$^2$ and covering 5 to 60% of the surface. The compound sheet is characterized in that the embossed sheet comprises a second embossing pattern with bosses 0.1 to 0.30 mm high.

7 Claims, 1 Drawing Sheet

COMPOUND SHEETS MADE OF ABSORBENT PAPER

The present invention concerns novel compound sheets of absorbent paper.

More particularly, the objects of the invention are papers for household use, especially cellulose-wool type crepe paper. In this field, highly absorbent paper with high softness and mechanical strength is much sought after.

For a number of years already, papers having several plies have been used in this field, as a rule two or three plies, which previously had been embossed and then slightly bonded to each other with the adhesive being deposited at the tops of projections created during embossing.

Presently, two different systems for embossing, assembling and bonding are being used whereby two different kinds of structures are made. A first kind consists in identically embossing two separate paper plies so as to obtain projections from the sheets and to form a laminate from these two sheets. The projections of the two sheets point to the inside of the laminate and are bonded at their tops. This procedure leads to what shall be called tip-to-tip assembly. Such a procedure as well as the laminates so made, are described in U.S. Pat. No. 3,414,459. It is essentially possible thereby to make two-ply papers having the structure shown in FIG. 6 of the patent. Another variation described therein consists in sandwiching an unembossed sheet between the two embossed sheets before the tips are bonded together.

Another procedure is described in U.S. Pat. No. 3,867, 225 and consists in making a laminate between two embossed sheets arrayed in such a manner that the projections point inward of the laminate, i.e., the projection tips of one of the two sheets are coated with glue and the bonding is carried out in such a position that the projections of one of the sheets will nest between two projections of the other sheet. Such structures are called "nested".

The object of the present invention is to improve the touch, flexibility and appearance of the known absorbent-paper compound sheets of the prior art and, in particular, to improve the products assembled in nested or tip-to-tip manner wherein each ply evinces an embossed pattern with the height of the bosses being between approximately 0.5 and 2.5 mm and evincing a density between 3 and 20 bosses per $cm^2$ while amounting to 5 to 60% of the total area.

This result is achieved in the invention using a compound sheet of the above described paper which is characterized by the embossed sheet comprising a second embossing pattern with bosses 0.1 to 0.30 mm high enclosing the bosses of the first pattern.

This second embossing, which can be called microembossing, imparts a more pleasant textile look to the sheet because the spaces between the bosses of greater depth are occupied. Furthermore, such embossing improves the sheet's feel and flexibility.

Preferably, the density of the second pattern is between 20 and 300 bosses per $cm^2$, and in particular between 40 and 100. Beyond 300, the bosses no longer can be seen, the sheet then appearing smooth.

Advantageously, the ratio of the density of the second pattern to the first pattern exceeds 2 whereby at least one micro-boss is located between any two bosses of the first pattern.

Applicant is aware of U.S. Pat. No. 4,320,162 proposing a two-sheet paper structure wherein each sheet comprises two embossing patterns, namely, a first and relatively spaced-apart pattern with wide bosses that are 1 to 2.3 mm deep and a more compact pattern of thin bosses enclosing the former and only 0.38 to 1.27 mm deep. The two sheets are bonded to each other by the tips of the first-pattern bosses. This patent specifies that the comparatively wide spacing between the bosses of the first pattern allows the second-pattern bosses to make contact by their tips on account of the bending of the sheet. Accordingly, this second pattern imparts softness, absorption and bulk to the second sheet and improves its appearance.

The compound sheet of the present invention differs from that of the '162 patent in that the first pattern evinces a density of more than 3 bosses/$cm^2$ while the covered area is 5 to 60%, whereas the patent comprises comparatively wide bosses each reproducing, for example, a flower design, and are widely spaced apart. Moreover, whereas in the present invention the bosses of the second pattern are at most 0.3 mm deep (the selected depth depending predominantly on the specific weight and being 0.1 mm for low specific weights and 0.30 mm for higher specific weights). The bosses of the second pattern of U.S. Pat. No. 4,320,162 are 0.38 to 1.27 mm deep depending on the specific weight of the embossed sheet, their purpose being to make contact by their tips because of the wide spacing between the bosses of the first pattern.

Other features and advantages of the invention are elucidated in the following description of two embodiment modes as shown in the attached drawings.

Figure 1:
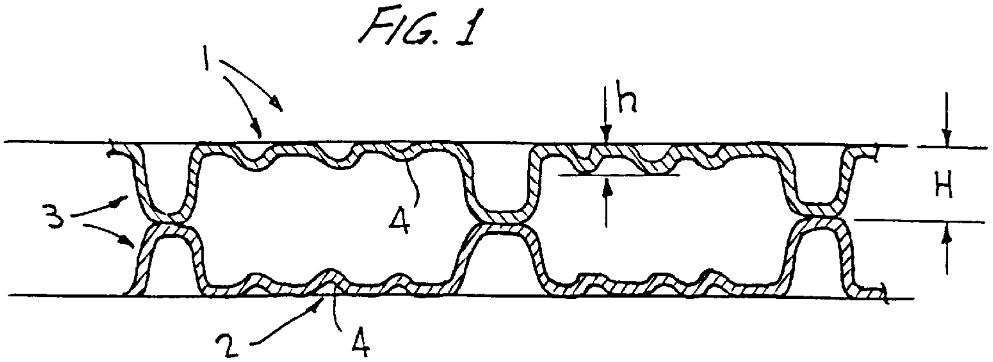
FIG. 1 is a compound sheet of the invention which are joined tip-to-tip.

FIG. 1 is an enlarged cross-section of a compound sheet of the invention. This compound sheet consists of two sheets 1 and 2 of crepe absorbent paper of which the characteristics as a rule depend on the intended application, i.e., toilet paper, paper towels, napkins, table coverings, and the like. The specific weight of this paper is between 12 and 30 $g/m^2$ and also depends on the application. Its crepe ratio preferably is between 10 and 30%. Prior to embossing, the thickness of such a sheet is between 0.07 and 0.2 mm.

As shown in FIG. 1, each sheet 1 and 2 comprises a first and relatively deep embossing pattern 3. The two sheets are joined together and bonded at the tops of the bosses of this first pattern. This assembly is known as being tip-to-tip.

For this kind of product, the bosses have a height H between 0.5 and 2.5 mm wherein the height is measured between the plane of the flat side and the plane defined by the tops of the bosses. The bosses are spread in a typically regular but arbitrary pattern with a density of 3 to 19 bosses per $cm^2$ and take up from 5 to 60% of the area. The boss cross-section is arbitrarily oval, circular or other shape.

In accordance with the invention, at least one sheet, and in the embodiment mode being shown, both of the compound sheets comprise a second embossing pattern 4 consisting of smaller bosses of small height h between 0.1 and 0.30 mm which are spread between the bosses of the first pattern. The height selection depends on the specific weight and the crepe ratio of the paper. Illustratively, the boss height can be 0.25 to 0.30 mm for a coarse-crepe paper of 30 $g/m^2$. For a paper of lesser specific weight, this height can be between 0.1 and 0.2 mm. The boss density of this second pattern is higher than that of the first pattern and, preferably, it is in a ratio of at least 2.

A third sheet can be sandwiched between the two embossed ones without thereby exceeding the scope of the invention.

Figure 2:
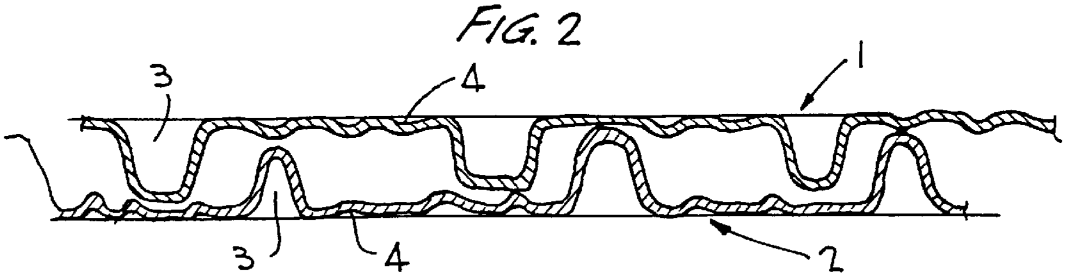
FIG. 2 is a compound and nested sheet of the invention.

FIG. 2 shows a so-called nested assembly of sheets 1 and 2 where the bosses 3 of the sheet 1 representing the first pattern nest between the bosses 3 of the second sheet 2. The two plies are linked by a coat of glue deposited on the top of the bosses of the first pattern of one of the sheets.

Equipment known per se is described below, which provides for manufacturing the sheet of the invention.

Figure 3:
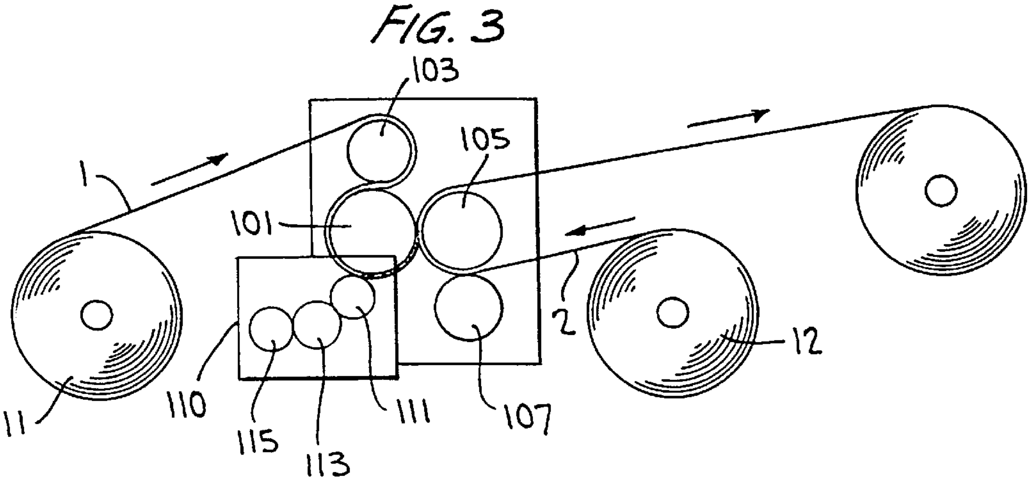
FIG. 3 shows equipment with which to make the sheets of the invention.

FIG. 3 shows a first pair of cylinders 101, 103 comprising an engraved cylinder 101 with a surface shaped in relation to a desired pattern. This metal cylinder is rotationally driven about a horizontal axis and cooperates with a rubber cylinder 103 parallel to it with which it subtends a compression gap or nip 101, 103. When passing through this gap, a cellulose-wool sheet of paper undergoes permanent mechanical deformation caused by the pressure applied by the topology of the metal cylinder.

To achieve the desired embossing, the cylinder topology is divided into two patterns: a first pattern with projection heights of at least 2 mm and a second pattern with projection height, illustratively, of 0.6 mm.

The equipment comprises a second pair of embossing cylinders, namely, a metal cylinder 105 with the same diameter and rotating in the same horizontal plane as the cylinder 101 and cooperating with a rubber cylinder 107 for embossing.

The cylinders 101 and 105 subtend a compression gap or nip 101, 105 and are driven in synchronous but opposite rotational speeds so that they roll on each other without slippage.

The equipment furthermore comprises a glue-depositing system 110 having a depositing cylinder 111 made of rubber or equivalent material pressing against the cylinder 101 upstream of the compression gap 101, 105. A transfer cylinder 113 transfers the adhesive from an immersion cylinder 115 onto the depositing cylinder 111. The immersion cylinder 115 picks up the glue in a tub.

The absorbent-paper sheets 1,2 to be joined are fed from reels 11, 12. Sheet 1 is guided round the rubber cylinder 103 and passes into the compression gap 101, 103 from which it exits in embossed form matching the topology of metal cylinder 101. The depositing cylinder 111 then deposits adhesive in dosed amounts onto the flats forming the tops of the sheet's projections.

The second sheet 2 also is mechanically embossed by passing through the compression gap 105, 107 and then is combined with the sheet 1 in the compression gap 101, 105.

The compound sheet so made is then wound up while waiting to be moved away.

The sheets of the invention can be made in two stages. That is, they can be pre-embossed, either one or both sheets, with the second pattern, and then they can be embossed once more with the first pattern.

The embodiment mode shown in FIG. 3 preferably is for tip-to-tip linking.

As regards the nested combination, preferably equipment as known in the prior art is used.

The invention is not restricted to the above-described embodiment modes but rather does cover all variations within one skilled in the art.

It is claimed:

1. A compound sheet of absorbent paper comprising at least two sheets of paper wherein (a) each sheet has a specific weight of between 12 to 30 g/m$^2$ and (b) at least one of said at least two sheets comprises (i) a first embossing pattern with bosses which point inward of the compound sheet and are between 0.5 to 2.5 mm high, has a density of 3–20 bosses per cm$^2$, and covers 5–60% surface area of the sheet, and (ii) a second embossing pattern having a density of at least 40 bosses per cm$^2$ and wherein said bosses point inward of the compound sheet and are from 0.1 to 0.3 mm high.

2. Compound sheet according to claim 1 wherein said bosses of said second embossing pattern are from 0.1 to 0.2 mm high.

3. Compound sheet according to claim 1 wherein said second embossing pattern has a density of between 40 to 300 bosses per cm$^2$.

4. Compound sheet according to claim 3 wherein said density is between 40 to 100 bosses per cm$^2$.

5. Compound sheet according to either claims 1, 2, or 3 wherein a ratio of the density of bosses of said second embossing pattern to said first embossing pattern exceeds 2:1.

6. Compound sheet according to claim 1 wherein said at least two sheets are embossed and bonded in a tip-to-tip manner with the bosses of said first embossing pattern.

7. Compound sheet according to claim 1 wherein said at least two sheets are embossed and bonded in a nested manner with the bosses of said first embossing pattern of one sheet and the bosses of said second embossing pattern on another sheet.

* * * * *